United States Patent [19]  [11]  4,243,564
Mavis  [45]  Jan. 6, 1981

[54] REACTION PRODUCTS OF A HYDROLYZED STYRENE-MALEIC ANHYDRIDE COPOLYMER AND A DISPERSED HIGH AMYLOPECTIN STARCH PRODUCT NEUTRALIZED WITH A VOLATILE ALKALI, METHOD OF MAKING SAME, AND COATING COMPOSITIONS COMPRISING SAME

[75] Inventor: Robert C. Mavis, Lodi, N.J.

[73] Assignees: Moses Konigsberg, Tenafly, N.J.; Henry A. Fremont, Wyoming, Ohio; G. Howard Kingsley, New London, N.H.

[21] Appl. No.: 40,228

[22] Filed: May 18, 1979

[51] Int. Cl.$^3$ .................................................. C08L 3/12
[52] U.S. Cl. ............................ 260/17.4 ST; 428/511; 428/535
[58] Field of Search ................................ 260/17.4 ST

[56] References Cited

U.S. PATENT DOCUMENTS

| Re. 26,510 | 12/1968 | Mazzarella et al. | 260/17.4 ST |
| 3,366,587 | 1/1968 | Uffner | 260/17.4 ST |
| 3,368,987 | 2/1968 | Pollart et al. | 260/17.4 ST |
| 3,730,925 | 5/1973 | Kovats | 260/17.4 ST |
| 3,939,108 | 2/1976 | Sirota et al. | 260/17.4 ST |

FOREIGN PATENT DOCUMENTS 232311  1/1961  Australia ........................ 260/17.4 ST

*Primary Examiner*—Edward M. Woodberry
*Attorney, Agent, or Firm*—Sigalos & Levine

[57] ABSTRACT

The volatile alkali salt of the reaction product of a waxy starch product having a high amylopectin content and styrene-maleic anhydride copolymer and the method of making such product comprising hydrolyzing the copolymer in the presence of the high amylopectin starch product at an elevated temperature and in the presence of water for a time sufficient to hydrolyze the copolymer, disperse the starch in water, and permit the copolymer and starch to react, adding a volatile alkali to the heated mixture, and continuing the heating for a time sufficient to form the volatile alkali salt of said reaction product. The invention also comprises coatings comprising the volatile alkali salt of said reaction product.

11 Claims, No Drawings

REACTION PRODUCTS OF A HYDROLYZED STYRENE-MALEIC ANHYDRIDE COPOLYMER AND A DISPERSED HIGH AMYLOPECTIN STARCH PRODUCT NEUTRALIZED WITH A VOLATILE ALKALI, METHOD OF MAKING SAME, AND COATING COMPOSITIONS COMPRISING SAME

BACKGROUND OF THE INVENTION

At the present time proteinaceous polymers such as casein and soy protein are used in various coating compositions; paper coatings and paints and the like. These proteinaceous materials, and particularly casein, have probably been the most generally used colloidal materials in the coating industry, especially for high grade paper coatings. Dispersions of casein are readily prepared and are good as pigment dispersion media. Moreover, they are compatible with many resin and elastomeric latices and the casein is easily insolubilized.

Pigmented coatings are generally applied to various substrates for several reasons, i.e., for protection of the substrate, for decorative purposes, and for making the substrate more suitable for other operations such as printing or laminating.

While clearly suitable, casein and soy protein are susceptible to bacterial degradation and more particularly, these proteinaceous materials are subjected to very extensive variations in terms of cost and availability since they are used as food proteins and hence often become too expensive or unavailable for usage in coatig as discussed above.

Efforts to substitute other materials for these proteinaceous polymers have not been successful either because the materials used do not give the desired coating properties or dispersing properties of the proteinaceous materials, or because they themselves are incapable of having stable viscosities at high and medium solids concentrations, or fail to give the proper adhesive strength and pigment binding power. In short, they fail to give the desired rheological properties obtained when casein is used.

SUMMARY OF THE INVENTION

Novel reaction products have now been found which are suitable and economic replacements for proteinaceous polymers, such as casein and soy protein, and which have properties in coating compositions that are equivalent to or superior to these proteinaceous polymers.

Briefly stated, the present invention comprises the volatile alkali salt of a reaction product of a waxy starch product having a high amylopectin content and a styrene-maleic anhydride copolymer. The invention also comprises the method of making such reaction product suitable for replacing proteinaceous polymers used in coatings comprising admixing a waxy starch product having a high amylopectin content and a styrene-maleic anhydride copolymer in water and heating at an elevated temperature for a time sufficient to hydrolyze the copolymer, disperse the starch, and permit the copolymer and starch to react, adding a volatile alkali to the reaction product, and continuing the heating for a time sufficient to form the volatile alkali salt of said reaction product.

The invention also comprises coating compositions, especially paper coating and paint compositions comprising the reaction products noted above and such paper and paint compositions.

DETAILED DESCRIPTION

The reaction product of the present invention is formed by reacting a high amylopectin containing waxy starch product with a styrene-maleic anhydride copolymer in water in the presence of a volatile alkali salt.

As to the waxy starch product, it is preferred to use the high amylopectin conversion products. It is known that all starches contain two types of molecular structures; an amylose fraction which is essentially linear and an amylopectin fraction which is highly branched. Products from which starch is obtained, such as corn, have been developed which contain a high percentage of the amylopectin fraction; such as waxy maize, and waxy sorghum. Such waxy products, and like products having a high amylopectin content and their conversion products are well-known to those skilled in this art and are herein referred to as "high amylopectin starches." High amylopectin starches are readily available with commercial examples being CPC International's products, Texofilm 6448, Anheuser Busch product, AB 7348, and National Starch & Chemical product, Amioca 50.

The high amylopectin starches are preferred because they form more stable aqueous dispersions than normal starches (less setback or gelling) and this results in reaction products that have the suitable rheological properties required for acceptable coatings and other applications.

With respect to the styrene-maleic anhydride copolymer, while any of such commercially available copolymers can be used, it has been found that, unexpectedly superior coating compositions result if SMA 3000 by ARCO Chemical Company is used. SMA 3000 is a resin prepared from a 3:1 ratio of styrene to maleic anhydride having a molecular weight of 1900 and an acid number of 275. Other copolymers that can be used include LYTRON 810 by Monsanto Company made from a 1:1 ratio of styrene to maleic anhydride having a molecular weight of 50,000 and an acid number of 320.

As to proportions, the ratio of copolymer to starch may be varied over a wide range depending upon the desired effect and/or economic considerations. Suitable products are obtained with ratios of 5% to 45% by weight copolymer to correspondingly 95% to 55% by weight of the high amylopectin starch. The preferred range is 10% to 30% by weight copolymer and correspondingly 90% to 70% by weight starch.

Referring to the volatile alkali, it can be any of these known and conventionally used to neutralize acidic reation products. It is preferred, however, to use ammonium hydroxide, preferably 28% ammonium hydroxide, for the neutralization because it is less expensive than other volatile alkali materials. The volatile alkali leaves the aqueous composition on drying and thereby adds more water resistance to the resultant dried film. The amount used is that sufficient to neutralize the reaction product acid groups as discussed below. Preferably, for coating uses sufficient alkali is added to neutralize and give the reaction product salt a pH over about 8.5.

While not necessary, in some instances it may be beneficial to add small quantities of a metal oxide, such as zinc oxide, to the reaction mixture. These are added in very limited amounts; preferably from about 0.5% to 5% by weight based on the weight of the styrene-maleic anhydride copolymer.

The method of making the reaction product is critical. It is essential that the high amylopectin starch and styrene-maleic anhydride copolymer aqueous mixture be heated at an elevated temperature for a time sufficient to ensure that the starch is dispersed, the copolymer is hydrolyzed, and the reaction between the two is substantially completed.

A temperature range from ambient temperature to about 200° F. can be used with the preferred range being about 160° to 175° F. At room temperature the copolymer will hydrolyze very slowly and, of course, if ambient temperature is too cold the starch will not be dispersed. For practical commercial operations elevated temperatures should be used. At elevated temperatures the reaction will be complete in about 25 to 45 minutes. At this point, the ammonium hydroxide is added with mixing and the heating at the same temperatures as initially is continued preferably for 10 to 15 minutes until such time as a homogeneous mixture is formed. Neutralization is essentially instantaneous.

The temperature-time relationships are not critical, but important, again, in an economic sense. Again, the important aspect of the initial heating is to insure that all the styrenemaleic anhydride copolymer is hydrolyzed, the starch fully dispersed, and the reaction between them substantially completed. The reaction is essentially complete when the copolymer is completely hydrolyzed. As noted above, heating after addition of the volatile alkali is simply to ensure that a homogeneous mixture is formed.

While the precise structure of the reaction product is not presently known, a reaction product does result from the reaction between the copolymer and the starch. It is presently believed that the reaction occurs between the acid groups formed as the copolymer hydrolyzes and the hydroxyl groups of the starch. The remaining acid groups are converted by the ammonium hydroxide to the ammonium salt. This product, gives good film integrity and is a good pigment dispersion media. Also, the resultant dried film is continuous and quite water resistant and, of course, as noted, the aqueous dispersions of the reaction products are excellent pigment dispersion media.

The conclusion that a reaction has occurred is supported by film characteristics of cast films. It has been found that if an ammoniacal solution is made of the styrene-maleic anhydride copolymer only and cast as a film and dried, the resulting film is readily shattered. If the starch is heated at the temperatures discussed above, with or without ammonium hydroxide, cast as a film on glass and then dried, while it has better integrity than the styrene-maleic anhydride film discussed above, it is also quite friable. Lastly, if there is simply an admixture of the copolymer solution and the starch solution and such solution is cast as a film on glass and dried, it also is quite friable and readily shattered. It is only when one follows the conditions noted above in making the reaction product that one is able to obtain a resulting dried film showing a high degree of integrity, good water resistance, and one which is not readily shattered.

The reaction product solution of the present invention when added in place of casein solutions in various standard coating formulas shows equal or better properties. The concentration, of course, of the cook and the amounts added to a coating composition may be widely varied and adapted to suit each specific need.

In the examples that follow with respect to coating formulations of various types, the compositions utilizing the instant invention have been evaluated against similar coating compositions made with casein. In every instance, with respect to the following properties, it has been shown that the compositions of this invention are equivalent to or superior to their casein counterparts.

(1) Stable viscosities at medium and high solids concentrations,
(2) Adhesive strength and pigment bonding power,
(3) Film forming properties which enhance ink, varnish and grease resistance,
(4) Easy dispersion in water and more resistant to bacterial degradation,
(5) Better finish after calendering,
(6) Lighter film color which decreases the amount of titanium dioxide needed for desired whiteness,
(7) Better flow and leveling properties, and
(8) Adhesion and control of penetration into paper stocks.

As used herein, the term "paint resin" is used to refer to the usual resins or elastomers, such as polyacrylate dispersions, that are presently used in paint formulations and where presently materials such as casein solutions are used as pigment dispersion media.

The invention will be further described in connection with the examples that follow in which proportions are in pounds unless expressly stated to the contrary.

EXAMPLE 1

The general method of forming the reaction products is carried out by first admixing the following materials until a smooth, substantially uniform mixture is attained:

|  | Percent by Weight |
| --- | --- |
| Starch (TEXOFILM 6448) | 20.0 |
| Copolymer (SMA 3000) | 5.0 |
| Defoamer (Tributyl Phosphate) | 0.2 |
| Water | 70.8 |

The mixture is heated to 165° F. and held at that temperature until the starch is fully cooked and the resin hydrolyzed. The disappearance of the majority of resin particles indicates substantial completion of hydrolysis; about 20 to 45 minutes. Ammonium Hydroxide (28%), in an amount that is 80% by weight of the copolymer weight, is then thoroughly admixed therewith to achieve a homogeneous product having a pH over 8.5; about 10 to 15 minutes.

EXAMPLE 2

A high solids coating color for application on a Champion Coater was prepared by first admixing the following materials until a substantially uniform mixture is formed:
Water: 3800 lbs.
Tetrasodium Pyrophosphate: 8 lbs.
Tributyl Phosphate 8 lbs.
Clay (ASP—100): 3450 lbs
Titanium Dioxide (Tipure R 901): 400 lbs.
To this is added:
Styrene-Maleic Anhydride Copolymer (SMA 3000): 75 lbs.
High Amylopectin Starch Conversion (Texofilm #6448): 300 lbs.
Pine Oil: 7 lbs.
Mixing was continued until a smooth mixture was formed and the mixture was then heated to 165° F., held at this temperature for 30 minutes, and there was then added 60 lbs. of ammonium hydroxide (28%). The entire mixture was then cooked at 165° to 170° F. for 15 to 20 minutes and there was then added:
Water: 1300 lbs.
Polyacrylate Latex (Rhoplex AC-34): 810 lbs.
This product is an excellent high solids coating color.

EXAMPLE 3

A low solids coating color for reverse roll coaters was prepared by first stirring with a high speed mixer until a substantially uniform mixture was obtained:
Water: 5080 lbs.
Tributyl Phosphate: 8 lbs.
Clay (Ultra Cote): 3700 lbs.
To this mixture was added:
Styrene-Maleic Anhydride Copolymer (SMA 3000): 100 lbs.
High Amylopectin Starch Conversion (AB #7348): 400 lbs.

Mixing was continued until the entire mixture was smooth. It was then heated to 165° F., held at that temperature for 30 minutes, 80 lbs. of ammonium hydroxide (28%) were then added, the entire mixture was cooked at 165° to 175° F. for 15 to 20 minutes, cooled, and there was then added 480 lbs. of an SBR latex (Polyco 2440).

This low solids coating color performs as well as similar coating colors utilizing casein.

EXAMPLE 4

A high solids coating color for on-machine coating of paper or paperboard using separate reaction product solution and clay dispersion was prepared by first mixing until a substantially uniform mixture was formed:
Water: 2300 lbs.
Tributyl Citrate: 6 lbs.
Styrene-Maleic Anhydride Copolymer (SMA 3000): 207 lbs.
High Amylopectin Starch Conversion (Texofilm #6448): 483 lbs.

The mixture was heated to 165° F., held for 15 minutes at this temperature, 35 lbs. of ammonium hydroxide (28%) were added and admixed, and the entire mixture held at 165° to 170° F. for 5 minutes. This was followed by adding an additional 105 lbs. of ammonium hydroxide and mixing and holding at the same temperature for 30 minutes.

Separately, the following materials were admixed in a high speed mixer until a substantially uniform mixture was formed:
Water: 1720 lbs.
Defoamer (Nopco JMY): 25 lbs.
Sodium Hexametaphosphate: 10 lbs.
Clay (BG-90): 4250 lbs.
Titanium Dioxide )Tioxide RHL): 470 lbs.

To this was added 2875 lbs. of the reaction product prepared as described above. The two were admixed until a uniform mixture was formed and then 650 lbs. of an SBR Latex (DOW 620) was uniformly admixed therewith.

EXAMPLE 5

A low solids coating color for paper or paperboard was prepared by admixing in a Cowles dissolver:
Water: 3523 lbs.
Defoamer (colloid 680): 10 lbs.
Clay (Astraglaze): 3450 lbs.
Titanium Dioxide (Tipure R931): 380 lbs.

To this was added 2120 lbs. of the reaction product prepared as in Example 4, which was admixed therewith until a substantially uniform mixture was obtained.

Lastly, 480 lbs. of SBR Latex (DOW 620) were added and the entire mixture mixed until a smooth, uniform mixture was obtained.

EXAMPLE 6

A polyvinyl acetate homopolymer emulsion based coating color for a trailing blade coater was formed by admixing in a Kady mill until a substantially uniform mixture was obtained:
Water: 7750 lbs.
Tributyl Citrate: 1.5 lbs.
Tetrasodium Pyrophosphate: 1.5 lbs.
Clay (HydraGloss #9): 1350 lbs.
Titanium Dioxide: 150 lbs.
To this was added:
Styrene-Maleic Anhydride Copolymer (SMA 3000): 60 lbs.
High Amylopectin Starch Conversion (Amioca #50): 180 lbs.

It was mixed smooth, heated to 165° F., held for 30 minutes at this temperature, and then 10 lbs. of ammonium hydroxide (28%) were added and the entire mixture mixed at 165° F. for 5 minutes. An additional 30 lbs. of ammonium hydroxide (28%) were then added and admixed therewith at the same temperature for 30 minutes.

Lastly, 15 lbs. pine oil and 500 lbs. of a polyvinyl acetate homopolymer (Vinac 880) were added and thoroughly admixed with the heated mixture.

EXAMPLE 7

An ethylene-vinyl acetate copolymer based coating color for an Air Knife Coater was prepared by admixing until smooth (a substantially uniform mixture in a high speed dispenser:
Water: 5550 lbs.
Tributyl Phosphate: 3.5 lbs.
Tetrasodium Pyrophosphate: 3.5 lbs.
Clay (Hydrotex SD): 3260 lbs.
To this smooth mixture was added:
Styrene-Maleic Anhydride Copolymer (SMA 3000): 40 lbs.
High Amylopectin Starch Conversion (AB #7348): 160 lbs.

The entire mixture was mixed until smooth, heated to 165° F., held at this temperature for 15 to 20 minutes, and then 32 lbs. of ammonium hydroxide (28%) were added and admixed therewith.

The mixture was then held at 165° to 175° F. for 30 minutes and then mixed therewith until smooth were:
Pine oil: 10 lbs.
Ethylene-vinyl Acetate Copolymer (Airflex 100 HS): 950 lbs.

EXAMPLE 8

A flat wall paint using a polyacrylate dispersion was prepared by forming the reaction product. First, mixed until smooth were:
Water: 985 lbs.
Tributyl Citrate: 2.5 lbs.
High Amylopectin Starch Conversion (Amioca #50): 250 lbs.
Styrene-Maleic Anhydride Copolymer (SMA 3000): 100 lbs.

The smooth mixture was then heated to 165° F., held for 15 to 20 minutes, 17 lbs. of ammonium hydroxide (28%) were then admixed therewith and the entire mixture held at 165° F. for 5 minutes. An additional 51 lbs. of ammonium hydroxide (28%) were then admixed and the entire mixture held at the same temperature for 30 minutes.

The flat wall paint was prepared by admixing until smooth:
Water: 1000 lbs.
Defoamer (Colloid #711): 10 lbs.
Surfactant (Triton GS-10): 20 lbs.
Reaction product (prepared above): 1390 lbs.

Then 250 lbs. of hexylene glycol and 100 lbs. of ethylene glycol were mixed therewith until smooth.

There was then mixed therewith with a Cowles dissolver:
Titanium Dioxide(Tipure R901): 750 lbs.
Calcium Carbonate (ATOMITE): 2230 lbs.
Silicon dioxide (Insil Silica #31): 500 lbs.
and let down with:
Water: 2000 lbs.
Defoamer (COLLOID 680): 20 lbs.
Polyacrylate Dispersion (Rhoplex AC-34): 2300 lbs.

This paint performs in every respect as well as those utilizing casein or any other protein colloidal material used for this purpose.

The listing below identifies the manufactures of the various materials identified by their trade marks or trade names herein:

SMA resins are made by Arco Chemical Co.
Lytron Resins are made by Monsanto Chemical Co.
High amylopectin starch conversions are made by CPC International (Texofilm 6448), Anheuser Busch (AB 7348), National Starch & Chemical (Amoica 50).
Clays ASP-100, Ultra Cote, and BG-90 are made by Engelhard.
Clays HydraGloss #9 and Hydratex SD are made by J. M. Huber.
Astraglaza clay is made by Georgia Kaolin.
Atomite is calcium carbonate sold by Thompson-Weiman.
Insil Silica #31 is made by Illinois Mineral.
Tipure R901 and Tipure R931 are titanium dioxide made by DuPont.
Tioxide RHL is titanium dioxide made by Tioxide of Canada.
Zopaque R-77 is titanium oxide made by Glidden.
Rhoplex AC-34 is a polyacrylate dispersion made by Rohm & Haas.
Airflex 100 HS is an ethylene-vinylacetate polymer dispersion and Vinac 880 is a polyvinyl acetate homopolymer dispersion; both made by Air Products.
Dow 620 is an SBR latex made by Dow Chemical.
Polyco 2440 is an SBR latex made by Borden.
Nopco JMY is a defoamer made by Diamond Shamrock.
Colloid 680 and 711 are defoamers made by Colloids Inc.
Triton GF-10 is a surfactant made by Rohm & Haas.
Tributyl Phosphate and Tributyl Citrate are defoamers.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. The volatile alkali salt of a reaction product in an aqueous medium of a hydrolyzed styrene-maleic anhydride copolymer and a dispersed high amylopectin starch product.

2. The product of claim 1 wherein the copolymer is prepared from a 3:1 ratio of styrene to maleic anhydride and having a molecular weight of 1900 and an acid number of 275 and the high amylopectin starch is selected from a waxy maize, waxy sorghum, or mixtures thereof.

3. The product of claim 1 or 2 wherein the volatile alkali is ammonium hydroxide and the product has a pH of at least about 8.5.

4. The method of making a reaction product suitable for use in film-forming coating compositions comprising admixing a high amylopectin starch product and a styrene-maleic anhydride copolymer in water, heating at a temperature and for a time sufficient to hydrolyze the copolymer, disperse the starch, and form the reaction product, and thereafter neutralizing the reaction product with a volatile alkali.

5. The method of claim 4 wherein the high amylopectin starch is selected from a waxy maize, waxy sorghum, or mixtures thereof and the copolymer is prepared from a 3:1 ratio of styrene to maleic anhydride and having a molecular weight of 1900 and an acid number of 275.

6. The method of claim 4 wherein the heating is conducted at a temperature of from about 160° to 175° F. for a period of from about 25 to 45 minutes.

7. The method of making a product suitable for use in film-forming coating compositions comprising admixing a high amylopectin starch product with a styrene-maleic anhydride copolymer in water at a temperature of from about 160° to 175° F. for a period of about 25 to 45 minutes and thereafter adding ammonium hydroxide in an amount sufficient to give a pH of at least 8.5.

8. A film-forming coating composition comprising the product of claims 1, 2, or 3.

9. The film-forming coating composition of claim 8 including at least one paper coating pigment and an elastomeric or resin latex.

10. A coated paper comprising a paper sheet coated with the film-forming composition of claim 8.

11. A paint comprising at least one paint pigment, a paint resin and the film-forming composition of claim 8.

* * * * *